(12) United States Patent
Koide

(10) Patent No.: US 7,853,371 B2
(45) Date of Patent: Dec. 14, 2010

(54) ARTICLE TRANSPORT APPARATUS AND ARTICLE TRANSPORT METHOD

(75) Inventor: Hiroyuki Koide, Inuyama (JP)

(73) Assignee: Daifuku Co., Ltd., Osaka (JP)

(*) Notice: Subject to any disclaimer, the term of this patent is extended or adjusted under 35 U.S.C. 154(b) by 126 days.

(21) Appl. No.: 11/199,558

(22) Filed: Aug. 8, 2005

(65) Prior Publication Data

US 2006/0073002 A1   Apr. 6, 2006

(30) Foreign Application Priority Data

Aug. 9, 2004   (JP) .............................. 2004-232269

(51) Int. Cl.
   *G05D 1/00*   (2006.01)
(52) U.S. Cl. ........................ 701/23; 701/24; 414/273; 414/807; 414/909
(58) Field of Classification Search ................ 414/273, 414/807, 909; 701/23, 24
   See application file for complete search history.

(56) References Cited

U.S. PATENT DOCUMENTS

| | | | |
|---|---|---|---|
| 3,935,922 A * | 2/1976 | Cooper et al. ............... 180/168 |
| 4,811,229 A * | 3/1989 | Wilson ......................... 701/25 |
| 4,941,103 A | 7/1990 | Kato | |
| 5,002,449 A * | 3/1991 | Kita et al. .................... 414/273 |
| 5,118,191 A * | 6/1992 | Hopkins ...................... 356/368 |
| 5,179,329 A | 1/1993 | Nishikawa et al. | |
| 5,283,739 A | 2/1994 | Summerville et al. | |
| 6,049,745 A * | 4/2000 | Douglas et al. ............... 701/23 |
| 6,061,607 A * | 5/2000 | Bradley et al. .............. 700/216 |
| 6,129,025 A * | 10/2000 | Minakami et al. ........ 104/88.01 |
| 6,321,138 B1 * | 11/2001 | Livesay et al. .............. 700/245 |
| 6,602,037 B2 * | 8/2003 | Winkler ....................... 414/273 |
| 6,748,292 B2 * | 6/2004 | Mountz ...................... 700/214 |
| 2003/0130794 A1 * | 7/2003 | Miller et al. ................ 701/301 |
| 2004/0122570 A1 * | 6/2004 | Sonoyama et al. ............ 701/23 |

(Continued)

FOREIGN PATENT DOCUMENTS

JP          58167307 A      10/1983

(Continued)

*Primary Examiner*—Michael S Lowe
(74) *Attorney, Agent, or Firm*—The Webb Law Firm

(57) ABSTRACT

An article transport apparatus is provided with a path that is arranged along a plurality of article transferring locations and that has a first end and a second end, a plurality of article transporting vehicles that run along the path, and a controller that controls movement of the plurality of article transporting vehicles, and that processes transport request data that includes information specifying an article transfer location for transfer among the plurality of article transfer locations. The controller selects an article transporting vehicle for a transport process from the plurality of article transporting vehicles based on the transport request data, and moves the selected article transporting vehicle for a transport process to the article transferring location for transfer. Also, when the transport request data is processed while there is an article transporting vehicle currently performing a transport process, the controller moves the selected article transporting vehicle for a transport process to the article transferring location for transfer as long as a run range of the selected article transporting vehicle for a transport process does not interfere with an interference range, of a set length in the lengthwise direction of the path, that originates from the article transferring location for transfer corresponding to the article transporting vehicle currently performing a transport process.

8 Claims, 9 Drawing Sheets

U.S. PATENT DOCUMENTS

| | | | |
|---|---|---|---|
| 2005/0047895 A1 * | 3/2005 | Lert | 414/273 |
| 2006/0064503 A1 * | 3/2006 | Brown et al. | 709/238 |

FOREIGN PATENT DOCUMENTS

| | | | |
|---|---|---|---|
| JP | 8113319 A | | 5/1996 |
| JP | 2001019123 A | | 1/2001 |
| JP | 2001192103 A | | 7/2001 |
| JP | 2002-175117 | | 6/2002 |
| JP | 2002175117 A | * | 6/2002 |

* cited by examiner

ARTICLE TRANSPORT APPARATUS AND ARTICLE TRANSPORT METHOD

BACKGROUND OF THE INVENTION

The present invention relates to article transport methods and to article transport apparatuses provided with a plurality of article transporting vehicles that are arranged so as to pass through a plurality of article transferring locations and that run along a path having a first end and a second end, and control means that controls the movement of the plurality of article transporting vehicles.

Such article transport apparatuses can be employed in automated warehouses, for example. The control means selects an article transporting vehicle for the transport process based on sequentially generated transport request data and moves the article transport vehicle for transport that has been selected to a target article transferring location, and by repeating this transport process each time transport request data is generated using any one of a plurality of article transporting vehicles, transports articles between a plurality of article transferring locations.

In such article transport apparatuses, it is important that this transport process is performed using a plurality of article transporting vehicles while avoiding collisions among article transporting vehicles.

Conventionally, apparatuses including a run-capable range that includes a plurality of article transferring locations into which only one of two article transporting vehicles can enter is set in advance at both ends of a path, a shared range that allows two article transporting vehicles to enter at different times also is set in advance in a center portion of the path, and control means that performs control such that, regardless of whether or not an article transporting vehicle is currently carrying out the transport process, the article transporting vehicle for the transport process that has been selected is transported to a target article transferring location in such a manner that the range in which that article transporting vehicle that has been selected for transport based on the transport request data does not interfere with the other run-capable ranges have been proposed (see JP 2002-175117A).

More specifically, the control means selects one of the two article transporting vehicles as the article transporting vehicle for a transport process based on which run-capable range the target article transferring is located in, for example, and moves the article transporting vehicle for transport to the target article transferring location in such a manner that the run-capable range of the selected article transporting vehicle does not interfere with the run-capable range of the remaining vehicle.

The control means is configured such that if it is to move an article transporting vehicle for the transport process into the shared range, then it moves the article transporting vehicle that is already in the shared range out of the shared range, or keeps the article transporting vehicle for transport on standby outside the shared range until the article transporting vehicle inside the shared range moves out of the shared range, thereby keeping the two article transporting vehicles from entering the shared range at the same time.

Since one condition of this conventional article transport apparatus is that the run range of the article transporting vehicle selected for a transport process based on transport request data does not interfere with other run-capable ranges, there is a large range over which this interference may occur, and this limits the size of the run range of the article transporting vehicle selected for transport based on the transport request data and leads to the possibility that articles may not be efficiently transported by the plurality of article transporting vehicles. That is to say, since the run-capable ranges set in advance include a plurality of article transferring locations, the run capable ranges also include ranges in which the article transporting vehicle being moved cannot run.

Consequently, when transport request data is generated at a time when one article transporting vehicle that is performing transport processing is present, the remaining vehicle can only run in a small run range, and thus the remaining article transporting vehicle cannot perform transport and it is not possible for the plurality of article transporting vehicles to efficiently transport articles.

The present invention was arrived at in light of these problems, and it is an object thereof to provide an article transport apparatus and an article transport method that can efficiently transport articles using a plurality of article transporting vehicles.

SUMMARY OF THE INVENTION

An article transport apparatus is provided with:

a path that is arranged along a plurality of article transferring locations and that has a first end and a second end;

a plurality of article transporting vehicles that run along the path; and a controller that controls movement of the plurality of article transporting vehicles, and that processes transport request data that includes information specifying an article transfer location for transfer among the plurality of article transfer locations;

wherein the controller selects an article transporting vehicle for a transport process from the plurality of article transporting vehicles based on the transport request data, and moves the selected article transporting vehicle for a transport process to the article transferring location for transfer; and wherein when the transport request data is processed while there is an article transporting vehicle currently performing a transport process, the controller moves the selected article transporting vehicle for a transport process to the article transferring location for transfer as long as a run range of the selected article transporting vehicle for a transport process does not interfere with an interference range, of a set length in the lengthwise direction of the path, that originates from the article transferring location for transfer corresponding to the article transporting vehicle currently performing a transport process.

That is to say, it is possible to set the interference range to be smaller than that of a conventional interference range by setting the interference range to a set length in the lengthwise direction of the path, with the center of the interference range on the article transferring location for transfer that corresponds to the article transporting vehicle currently performing the transport process.

Consequently, the controller can set the run range of the article transporting vehicle selected for the transport process based on the transport request data to be a relatively large range, and thus it is possible to provide an article transport apparatus that can efficiently transport articles through a plurality of article transporting vehicles.

With the following method, it is possible to provide an article transport method that has the advantages described above.

That is to say, the article transport method according to the present invention includes:

determining whether or not there is an article transporting vehicle currently performing a transport process;

selecting one article transporting vehicle that is different from the article transporting vehicle currently performing a transport process from among the plurality of article transporting vehicles, based on the transport request data;

selecting an interference range having a set length in the lengthwise direction of the path about the target article transferring location for the article transporting vehicle currently performing a transport process; and determining whether or not a movement range of the other article transporting vehicle overlaps the interference range based on the transport request data, and if it is determined that there is no overlap, moving the other article transporting vehicle to the article transferring location for transfer.

DETAILED DESCRIPTION OF PREFERRED EMBODIMENTS

An embodiment of an article transport apparatus according to the present invention is described below based on the drawings.

Figure 1:
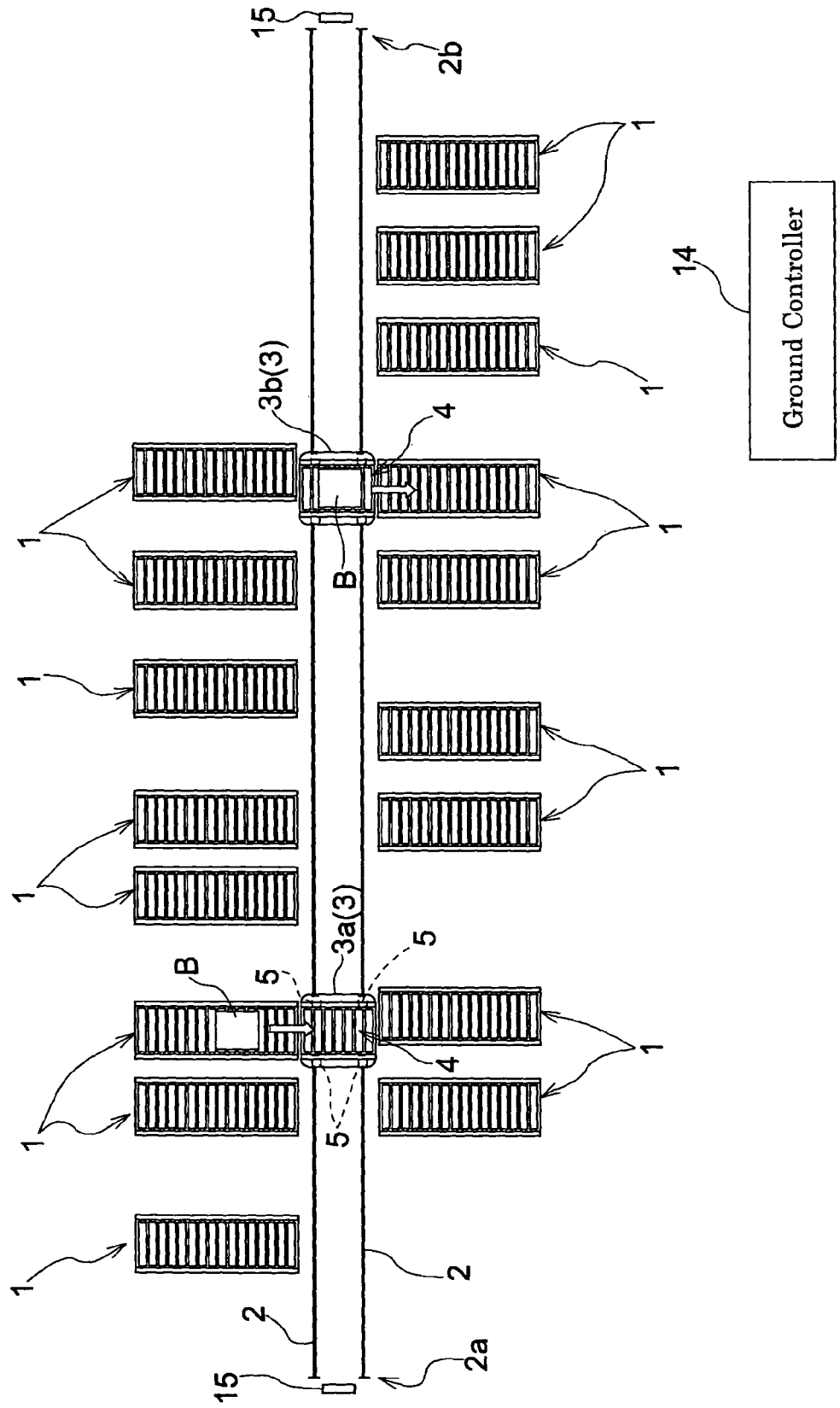
FIG. 1 is a plan view of a transport apparatus according to the present invention.

The article transport apparatus is for example employed in an automated warehouse provided with article storage shelves. As shown in FIG. 1, the article transport apparatus has a plurality of article handling vehicles 3, which serve as the article transporting vehicles, that travel over a path 2 between a plurality of stations 1, which serve as the article transferring locations, and in the present embodiment these plurality of article handling vehicles travel back and forth over a single path 2 to transport articles B between the plurality of stations 1.

The path 2 is provided in a straight line having two end portions 2a and 2b, and the plurality of stations 1 are provided on both the left and right sides of the path 2, separated from one another in the lengthwise direction.

As for the plurality of stations 1, they are constituted by a combination of delivery stations 1 provided with a delivery conveyor for transporting articles to be delivered from the article storage shelves, stocking stations 1 provided with a stocking conveyor for transporting articles to be stocked onto the article storage shelves, reception stations 1 provided with a reception conveyor for receiving articles from the outside, and shipping stations 1 provided with a shipping conveyor for shipping articles to the outside.

Two article handling vehicles 3 are provided, a first article handling vehicle 3a and a second article handling vehicle 3b, each which is provided with an electrically powered transfer device 4, such as a roller conveyor that transfers an article B between the article handling vehicle 3 and the station 1, and a plurality of running wheels 5 that run on a pair of running rails arranged along the path 2.

The running wheels 5 are made of drive running wheels 5 that are rotatively driven by an inverter-type travel motor 6, and driven wheels 5 that rotate freely.

Figure 2:
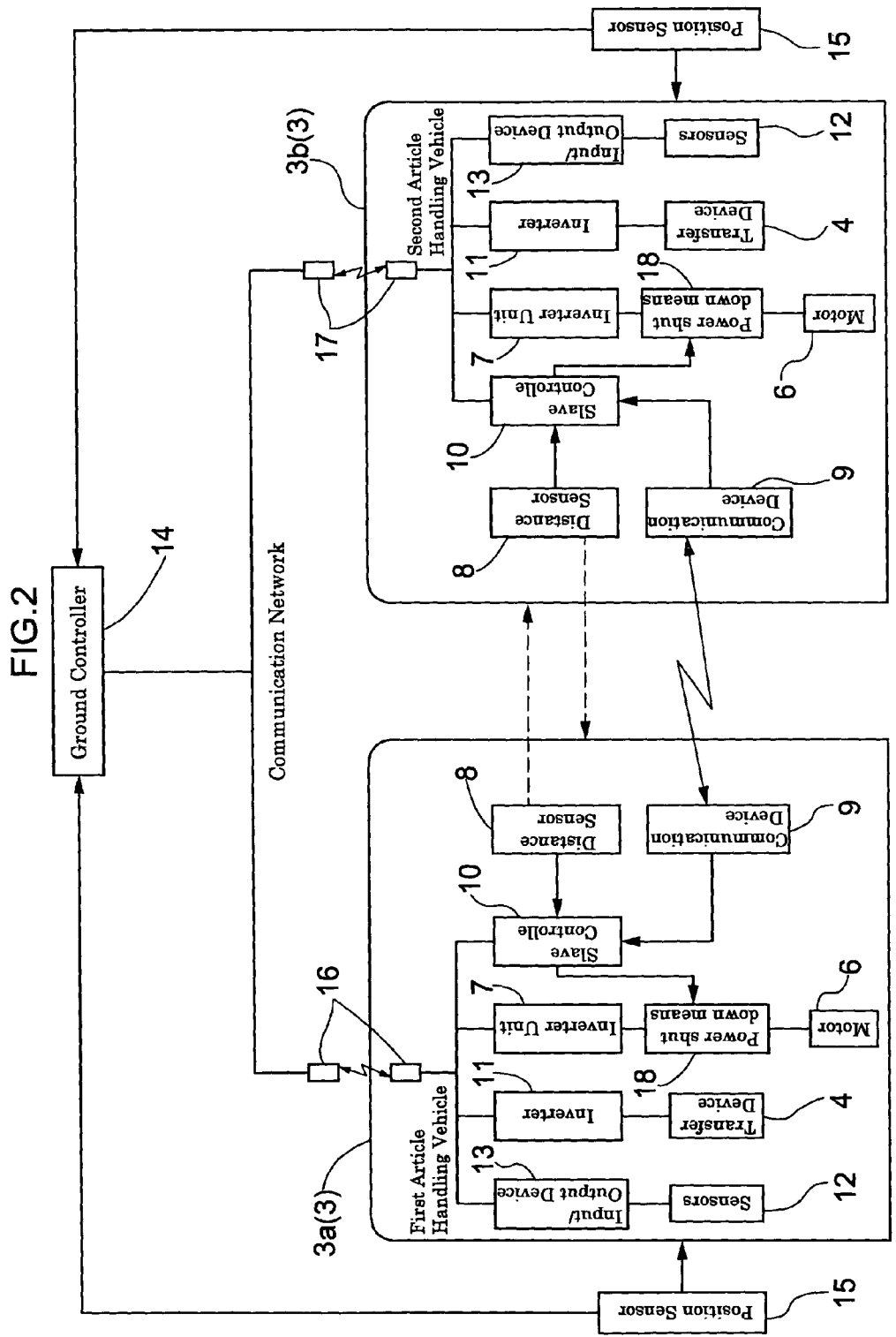
FIG. 2 is a block diagram of the transport apparatus.

As shown in FIG. 2, the first article handling vehicle 3a and the second article handling vehicle 3b are each provided with a travel inverter 7 for operating the travel motor 6 to drive the article handling vehicle 3, a vehicle distance sensor 8 for detecting the distance to the other article handling vehicle 3, a vehicle-to-vehicle optical transmission device 9 in order to communicate information between that article handling vehicle 3 and the other vehicle, a slave controller 10 for controlling the operation of the vehicle distance sensor 8 and the optical transmission device 9, a transfer inverter 11 for operating the transfer device 4, sensors 12 for detecting the state of the article B on the transfer device 4, for example, and an input-output device 13 for outputting the information detected by the sensors 12.

A single ground-side controller 14 serving as control means for managing the operation of the first article handling vehicle 3a and the second article handling vehicle 3b is provided on the ground side, such as the floor. The ground-side controller 14 is configured so as to control the operation of the travel inverters 7 and the transfer inverters 11, for example, in the first article handling vehicle 3a and the second article handling vehicle 3b.

At each of end portion 2a and 2b of the path 2 is provided a position detection sensor 15 for detecting the positions of the article handling vehicles 3 on the path 2 by detecting the distance from that end portion to the article handling vehicles 3. For the position detection sensors 15, conventional position detection sensors may be used, and these may use sound or magnetic waves to measure the positions.

Although not shown, communication controllers are provided on the ground-side controller 14 provided on the ground side, and on each of the travel inverters 7, the slave controllers 10, the transfer inverters 11 and the input-output devices 13 provided in the article handling vehicles 3. A first optical transmission device 16 for communicating information between the ground side controller 14 and the first article handling vehicle 3a, and a second optical transmission device 17 for communicating information between the ground-side controller 14 and the second article handling vehicle 3b are also provided.

The communication controller provided on the ground-side controller 14 side, the communication controllers provided on the article handling vehicles 3, the first optical transmission device 16 and the second optical transmission device 17 together make up a communication network known as a "device network". The ground-side controller 14 functions as a master, and the travel inverters 7, the slave controllers 10, the transfer inverters 11 and the input output devices 13 function as slaves.

The information detected by the position detection sensors 15 disposed at both end portions 2a and 2b of the path 2 is input to the ground-side controller 14, and the ground-side controller 14 is configured so as to control the positions of the first article handling vehicle 3a and the second article handling vehicle 3b on the path 2 based on the information detected by the position detection sensors 15.

In this way, the ground-side controller 14 is designed so as to control the operation of the first article handling vehicle 3a and the second article handling vehicle 3b by giving various types of instruction information to the first article handling vehicle 3a and to the second article handling vehicle 3b via the communication network while controlling the positions of the first article handling vehicle 3a and the second article handling vehicle 3b on the path 2.

The ground-side controller 14 transfers the article B to or from a station 1a for transfer through one of either the first article handling vehicle 3a and the second article handling vehicle 3b in accordance with the transport request data, which includes information that specifies a station 1a for transfer from among the plurality of stations 1.

The manner in which the ground-side controller 14 operates the two article handling vehicles 3 is described next. The ground-side controller 14 performs a selection process for selecting an article handling vehicle 3 for transport from among the first article handling vehicle 3a and the second article handling vehicle 3b based on the transport request data. After moving the article handling vehicle that it has selected for transport in the selection process to the objective station 1a, the ground-side controller 14 performs a transport process to transfer the article B to or from the station 1a for transfer.

The transport request data can be input to the ground-side controller 14 by a manually operated input device such as a keyboard, or by a computer, for example. The transport request data includes information specifying a station 1a for transfer from which the article B is to be received and a station 1a for transfer to which the article B is to be delivered, for example.

When transport request data is generated when there is no article handling vehicle 3 currently performing a transport process, the ground-side controller 14 runs the article handling vehicle 3 selected for the transport process in the selection process to the station 1a for transfer without limiting the run range of the article handling vehicle 3 that has been selected for transport based on the transport request data.

The ground-side controller 14 is configured such that when transport request data is generated when there is an article handling vehicle 3 currently performing a transport process, the ground-side controller 14 moves the article handling vehicle 3 selected for transport in the selection process to the station 1a for transfer in such a manner that the run range of the article handling vehicle 3 selected for transport in the selection process based on the transport request data does not interfere with an interference range of a set length in the lengthwise direction of the path 2 that is centered about the transfer target station 1A corresponding to the article handling vehicle 3 presently performing a transport process.

The ground-side controller 14 is also designed so as to manage the receiving transport process of running the selected article handling vehicle 3 to a target transfer station 1a to receive the article B, and the delivery transport process of running the article handling vehicle 3 that has performed the receiving transport process to the target transfer station 1a to deliver the article B, as separate transport processes.

That is to say, the ground-side controller 14 first performs the selection process for receiving and the receiving transport process to run the article handling vehicle 3 for transport that has been selected to the target transfer station 1a to scoop up the article B, and then after performing that receiving transport process, the ground-side controller 14 then performs the selection process for delivering and the delivering transport process so as to run the article handling vehicle 3 for transport that has been selected to the target transfer station 1 to deliver the article B.

The ground-side controller 14 is configured so that if the article handling vehicle 3 currently performing a transport process and the article handling vehicle 3 selected for transport based on the transport request data have the same direction of travel, then the ground-side controller 14 allows interference between the run range of the article handling vehicle selected for transport based on the transport request data and the interference range, and moves the article handling vehicle 3 selected for transport to the target transfer station 1a in such a manner as to avoid a collision with the article handling vehicle 3 currently performing a transport process.

More specifically, if the article handling vehicle 3 currently performing a transport process has the same direction of travel as the article handling vehicle 3 selected for transport based on the transport request data, then, for example, if there is a possibility that interference will not occur due to the transport process of the article handling vehicle 3 that is presently performing a transport process coming to an end, or by performing processing such as stopping the article handling vehicle 3 selected for transport based on the transport request data so as to avoid a collision with the article handling vehicle 3 currently a transport process, it is possible to avoid a collision between the article handling vehicles 3, even though the ground-side controller 14 has allowed the article handling vehicle 3 that has been selected for transport based on the transport request data to enter into the interference range.

As described in detail below, the ground side controller 14 is configured so as to allow the article handling vehicle 3 selected for transport based on the transport request data to interfere with an interference range K, thereby setting the run range of that article handling vehicle 3 to be as large as possible.

To describe the selection process more specifically, the ground-side controller 14 is configured such that when performing the receiving transport process, it performs a selection process for receiving to select an article handling vehicle 3 for transport from among the first article handling vehicle 3a and the second article handling vehicle 3b in accordance with various conditions, including whether or not the first article handling vehicle 3a and the second article handling vehicle 3b are currently performing transport processes, where the first article handling vehicle 3a and the second article handling vehicle 3b are located on the path 2, and whether or not the run range of the article handling vehicle 3 selected for transport based on the transport request data interferes with the interference range.

Furthermore, the ground-side controller 14 is also configured such that when performing the delivering transport process, like when performing the receiving transport process, it performs a selection process for receiving in order to select an article handling vehicle 3 for transport from among the first article handling vehicle 3a and the second article handling vehicle 3b in accordance with various conditions.

The selection process for receiving is described in further detail below.

When transport request data is generated, the ground-side controller 14 selects an article handling vehicle 3 for the transport process from the first article handling vehicle 3a and the second article handling vehicle 3b in order to carry out the receiving transport process.

When transport request data is generated when there is no article handling vehicle 3 presently performing a transport process, the ground-side controller 14 selects the article handling vehicle 3 of the first article handling vehicle 3a and the second article handling vehicle 3b that is closest to the station 1a for transfer as the article handling vehicle 3 for transport.

When transport request data is generated when there is an article handling vehicle 3 currently performing a transport process, the ground-controller 14 selects the remaining article handling vehicle 3 as the article handling vehicle 3 for transport, as long as the run range of the article handling vehicle 3 that is selected for transport based on the transport request data does not interfere with the interference range K.

Figure 3:
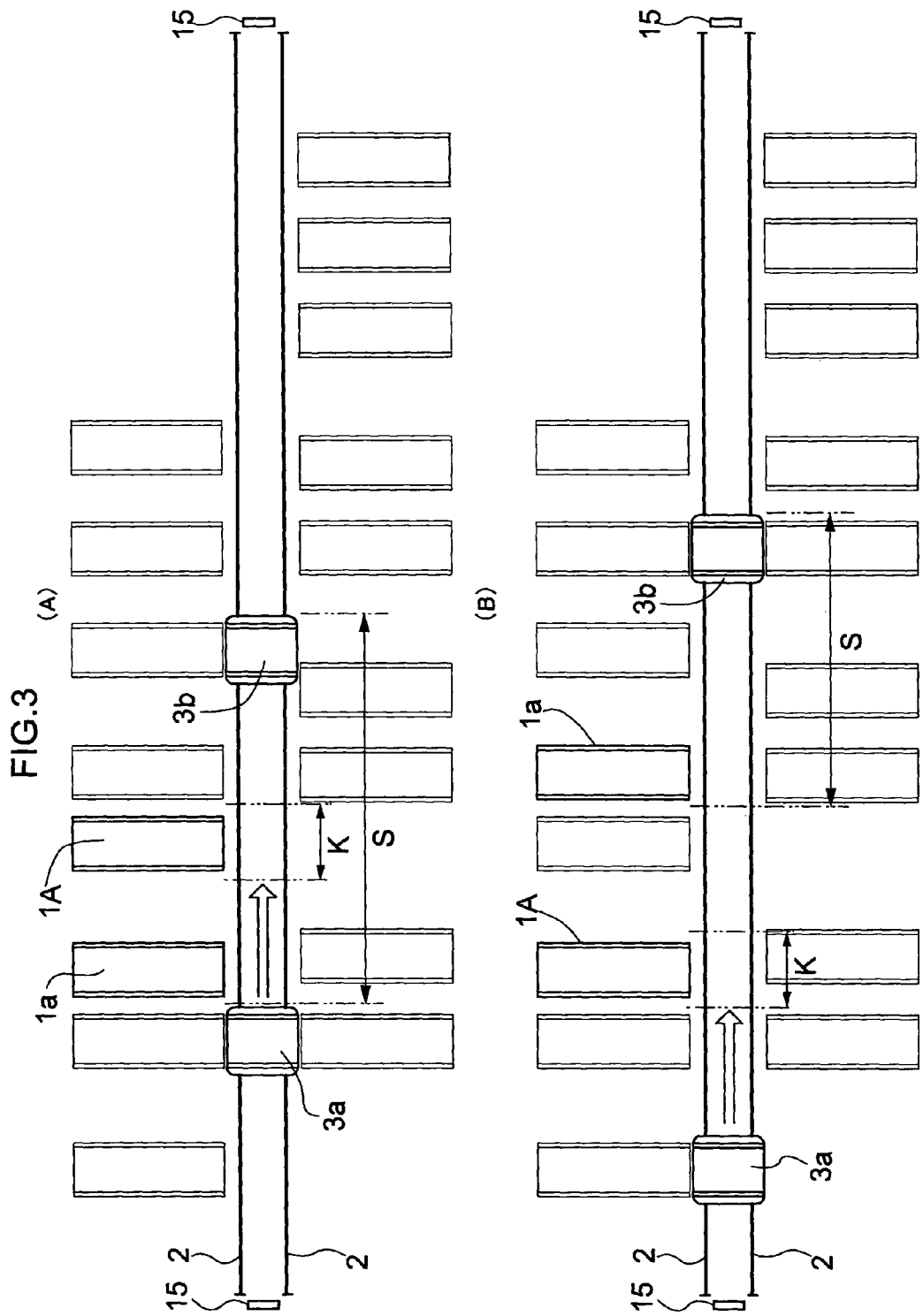
FIG. 3 is a plan view of the transport apparatus.

An instance in which transport request data is generated when there is an article handling vehicle 3 performing a transport process will be described in further detail based on FIG. 3. In FIG. 3, the first article handling vehicle 3a is performing a transport process, the station for transfer corresponding to the first article handling vehicle 3a that is presently performing a transport process is the station 1A, the second article handling vehicle 3b is the remaining vehicle that is not performing a transport process, and the remaining station for transfer that corresponds to the transport request data that have been generated is the station 1a.

As shown in FIG. 3, the ground-side controller 14 sets a range that is a combination of the length of the station 1a for transfer and the minimum distance between vehicles with which it is possible to avoid a collision between the article handling vehicles 3, as the interference range K for the objective station 1A that corresponds to the article handling vehicle 3a currently performing a transport process. Preferably, when the first article handling vehicle 3a is positioned at a predetermined position of station 1A, the interference range K is a range that includes the first article handling vehicle 3a in the direction of the path 2, with one end of the interference range K being separated from a corresponding end of the first article handling vehicle 3a in the direction of the path 2 by a first set distance range K, and the other end of the interference range K being separated from the corresponding other end of the first article handling vehicle 3a by a second set distance in the direction of the path 2. It is preferable that the first set distance and the second set distance are the minimum distance between vehicles with which it is possible to avoid a collision with the other article handling vehicle 3, but the distance may also be zero. It is preferable that at most, one end side of the interference range K includes only the closest other station to the station 1A on that side, and the other end of the interference range K includes only the closest other station to the station 1A on that side. Moreover, it is more preferable that the interference range K is set so as not to include the closest other stations to the station 1A.

The ground-side controller 14 is configured so that it sets an interference range K originating at the station 1a for transfer from which the article B is to be received if the transporting process performed at the time is the transporting process for receiving, and sets an interference range K originating at the station 1a for transfer to which the article B is to be delivered if the transport process performed at the time is the transport process for delivering.

In this way, the ground-side controller 14 performs the receiving transport process and the delivering transport process as separate transport processes, and by setting the interference range K separately for the receiving transport process and for the delivering transport process, the smallest possible range can be set for the interference range K, thereby achieving the largest possible run range for the article handling vehicle 3 that is selected for transport based on the transport request data.

As shown in FIG. 3A, the ground-side controller 14 is configured such that when moving the remaining vehicle, the second article handling vehicle 3b, to the station 1a for transfer, if its run range S interferes with the interference range K of the first article handling vehicle 3a that is currently performing a transport process, then the ground-side controller 14 does not select the remaining second article handling vehicle 3b as the article handling vehicle 3 for the transport process because the run range S of the remaining second article vehicle 3b will interfere with the interference range K.

Also, as shown in FIG. 3B, the ground controller 14 is configured such that when moving the remaining vehicle, the second article handling vehicle 3b, to the station 1a for transfer, if its run range S does not interfere with the interference range K of the first article handling vehicle 3a that is currently performing a transport process, then the ground-side controller 14 selects the remaining second article handling vehicle 3b as the article handling vehicle 3 for the transport process because the run range of the remaining second article vehicle 3b does not interfere with the interference range K.

Further, the ground-side controller 14 is configured such that when it has moved the remaining article handling vehicle 3 to the station 1a for transfer, if the run direction of the remaining article handling vehicle 3 is the same as that of the article handling vehicle 3 that is performing a transport process, then the ground-side controller 14 selects the remaining vehicle 3 as the article handling vehicle 3 for the transport process, even if the run range of the remaining article handling vehicle 3 interferes with the interference range K.

The selection process for delivering is described below. Here, the article handling vehicle 3b that has performed the receiving transport process is selected.

The ground-side controller 14 determines whether or not the article handling vehicle 3b that has performed the receiving transport process can perform the delivering transport process without interfering with the other article handling vehicle 3a, and if that vehicle 3b can perform the delivering transport process, then the ground-side controller 14 selects the article handling vehicle 3b that has performed the receiving transport process as the article handling vehicle 3 for the transport process.

When there is an article handling vehicle 3 that has performed the receiving transport process but there is no article handling vehicle 3 currently performing a transport process, the ground-side controller 14 selects the article handling vehicle 3 that has performed the receiving transport process as the article handling vehicle 3 for the transport process.

When there is an article handling vehicle 3 that has performed the receiving transport process and there is also an article handling vehicle 3 performing a transport process, the ground-side controller 14 selects the article handling vehicle 3 that has performed the receiving transport process as the article handling vehicle 3 for the transport process only if the run range of the article handling vehicle 3 that has performed the receiving transport process does not interfere with the interference range K of the article handling vehicle 3a range K.

That is to say, when moving an article handling vehicle 3 that has performed the receiving transport process to the objective station 1a, the ground-side controller 14 determines whether or not the run range of the article handling vehicle 3b that has performed the receiving transport process will interfere with the interference range K of the article handling vehicle 3a, and if it will not interfere, then the ground-side controller 14 selects the article handling vehicle 3b that has performed the receiving transport process as the article handling vehicle 3 for the transport process, and if it does interfere, then the ground-side controller 14 does not select an article handling vehicle 3 for the transport process.

When the ground-side controller 14 has moved the article handling vehicle 3b that has performed the receiving transport process to the station 1a for transfer if the run direction of the article handling vehicle 3a performing a transport process is the same as the run direction of the article handling vehicle 3b that has performed the receiving transport process, then the ground-side controller 14 selects the article handling vehicle 3 that has performed the receiving transport process as the article handling vehicle 3 for the transport process even if the run range of the article handling vehicle 3 that has performed the receiving transport process interferes with the interference range K.

The ground-side controller 14 is configured such that if the run range of the article handling vehicle 3b that has performed the receiving transport process interferes with the interference range K and the direction in which the article handling vehicle performing a transport process is traveling differs from the direction of travel of the article handling vehicle 3b that has performed the receiving transport process, then the ground-side controller 14 decides whether to place the article handling vehicle 3b that has performed the receiving transport process on standby in its present position, or to move the article handling vehicle 3b that has performed the receiving transport process to an evacuation station 1b that is away from the interference range K of the article handling vehicle 3a currently performing a transport process.

Figure 4:
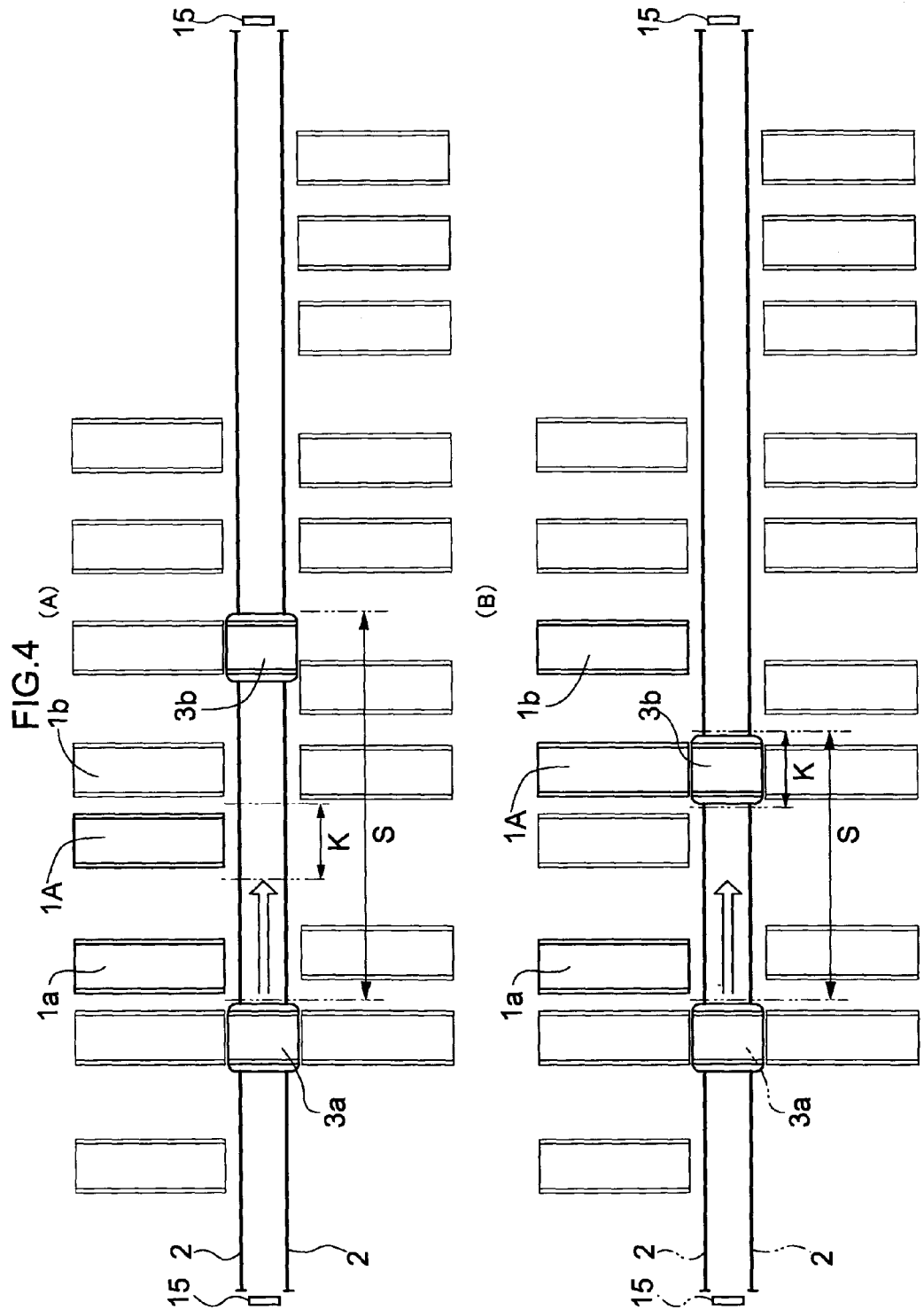
FIG. 4 is a plan view of the transport apparatus.

Further description based on FIG. 4 is provided below. In FIG. 4 the first article handling vehicle 3a is performing a transport process, the station for transfer corresponding to the first article handling vehicle 3a performing the transport process is the station 1A, the second article handling vehicle 3b is the remaining vehicle that is not performing a transport process, and the station for transfer corresponding to the transport request data that have been generated is the station 1a.

The ground-side controller 14 first finds the station 1 that is closest to the station 1a for transfer but that is outside the interference range K of the article handling vehicle 3 currently performing a transport process, and regards this as the evacuation station 1b.

As shown in FIG. 4A, if the evacuation station 1b that has been found is closer to the station 1a for transfer than the current position of the second article handling vehicle 3b that has performed the receiving transport process, then the ground-side controller 14 places the second article handling vehicle 3b that has performed the receiving transport process on standby in its present position.

Also, as shown in FIG. 4A, if the evacuation station 1b that has been found is farther from the station 1a for transfer than the current position of the second article handling vehicle 3b that, has performed the receiving transport process, then the ground-side controller 14 moves the second article handling vehicle 3b that has performed the receiving transport process to the evacuation station 1b that has been found.

The ground-side controller 14 is configured so as to preferentially select an article handling vehicle 3 that has been moved to the evacuation station 1b once already as the article handling vehicle 3 for the transport process, without moving it to the evacuation station 1b again.

Thus, as the article handling vehicle 3 for transport that is for performing the delivering transport process, the ground-side controller 14 selects an article handling vehicle 3 for a transport process giving priority to the delivering transport process.

Figure 5:
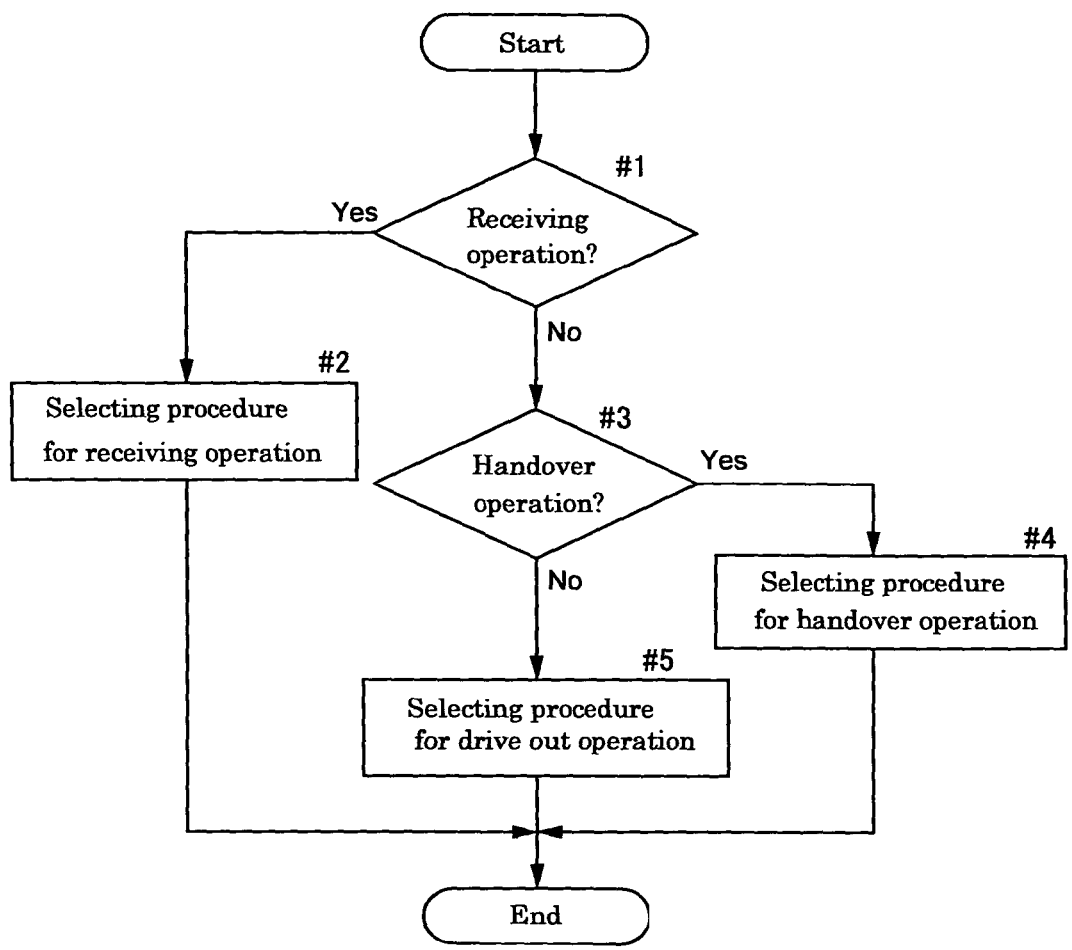
FIG. 5 is a flowchart showing the operation during a selection process by a ground-side controller.

The operation of the selection process by the ground-side controller 14 is described with reference to the flowchart of FIG. 5.

When transport request data specifying a station 1a for transfer from which the article B is to be received and a station 1a for transfer to which the article B is to be delivered have been generated and the receiving transport process is to be performed, the ground-side controller 14 performs the selection process for receiving (steps 1 and 2), and when the article handling vehicle 3 that has performed the receiving transport process is present and the delivering transport process is to be performed, the ground-side controller 14 performs the selection process for delivering (steps 3 and 4).

When neither the receiving transport process or the delivering transport process are to be performed, the ground-side controller 14 performs a selection process for removing (step 5), which will be described later.

Figure 6:
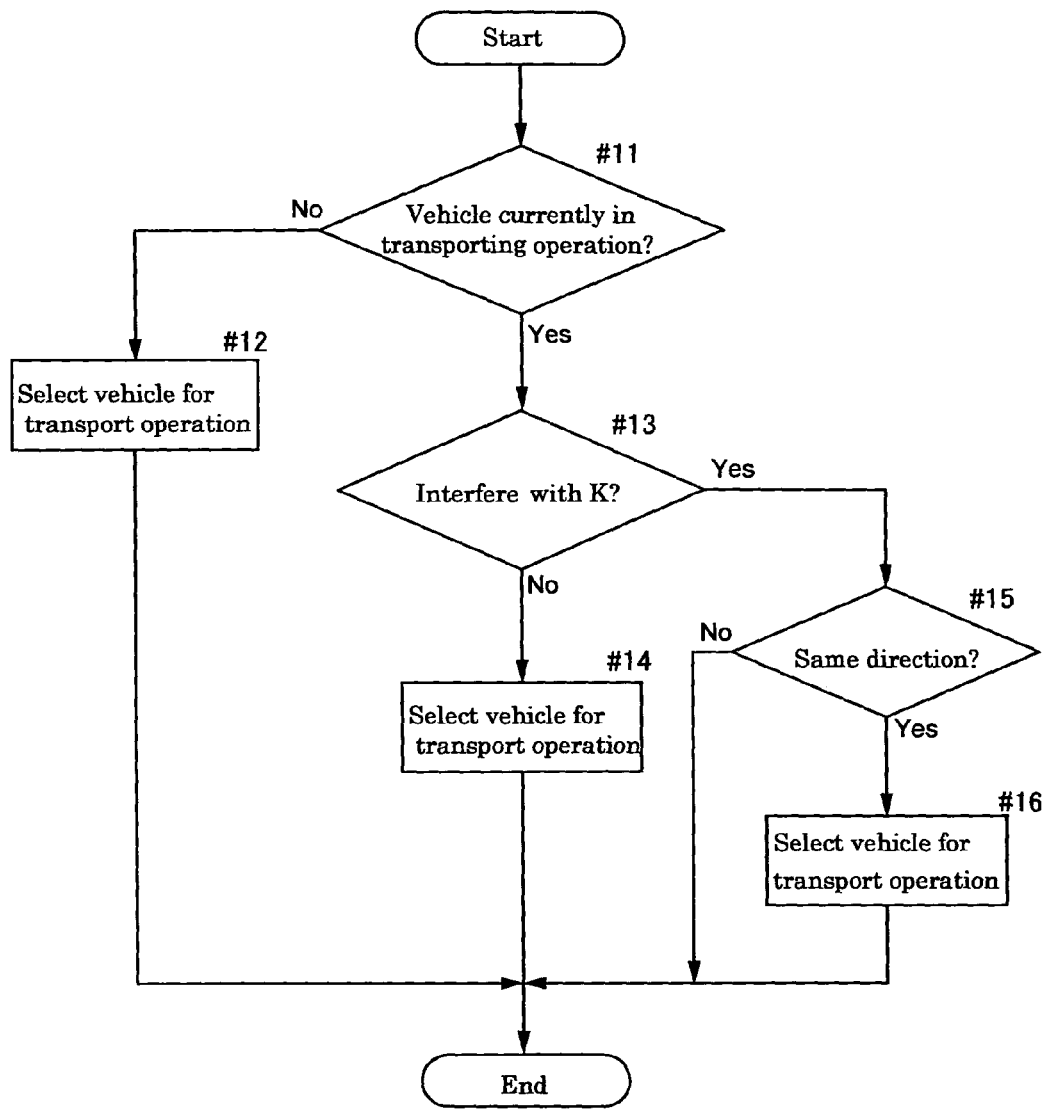
FIG. 6 is a flowchart showing the operation during a selection process for receiving by the ground-side controller.

In the selection process for receiving, as shown in the flowchart in FIG. 6, first the ground-side controller 14 determines whether or not there is an article handling vehicle 3 performing a transport process, and when no article handling vehicle 3 is currently performing a transport process, it selects the article handling vehicle 3 that is closest to the station 1a for transfer as the article handling vehicle 3 for the transport process (steps 11 and 12).

When there is an article handling vehicle 3 that is performing a transport process, the ground-side controller 14 selects the remaining vehicle to be the article handling vehicle 3 for the transport process, provided that the run range of the remaining article handling vehicle 3 that is selected based on the transport request data does not interfere with the interference range K (steps 13 and 14).

Further, the ground-side controller 14 selects the remaining vehicle to be the article handling vehicle 3 for the transport process range K even if the run range of the remaining article handling vehicle 3 that is selected based on the transport request data interferes with the interference range K, as long as the run direction of the article handling vehicle 3 that is currently performing a transport process is the same as the run direction of the remaining article handling vehicle 3 that has been selected based on the transport request data (steps 15 and 16).

Figure 7:
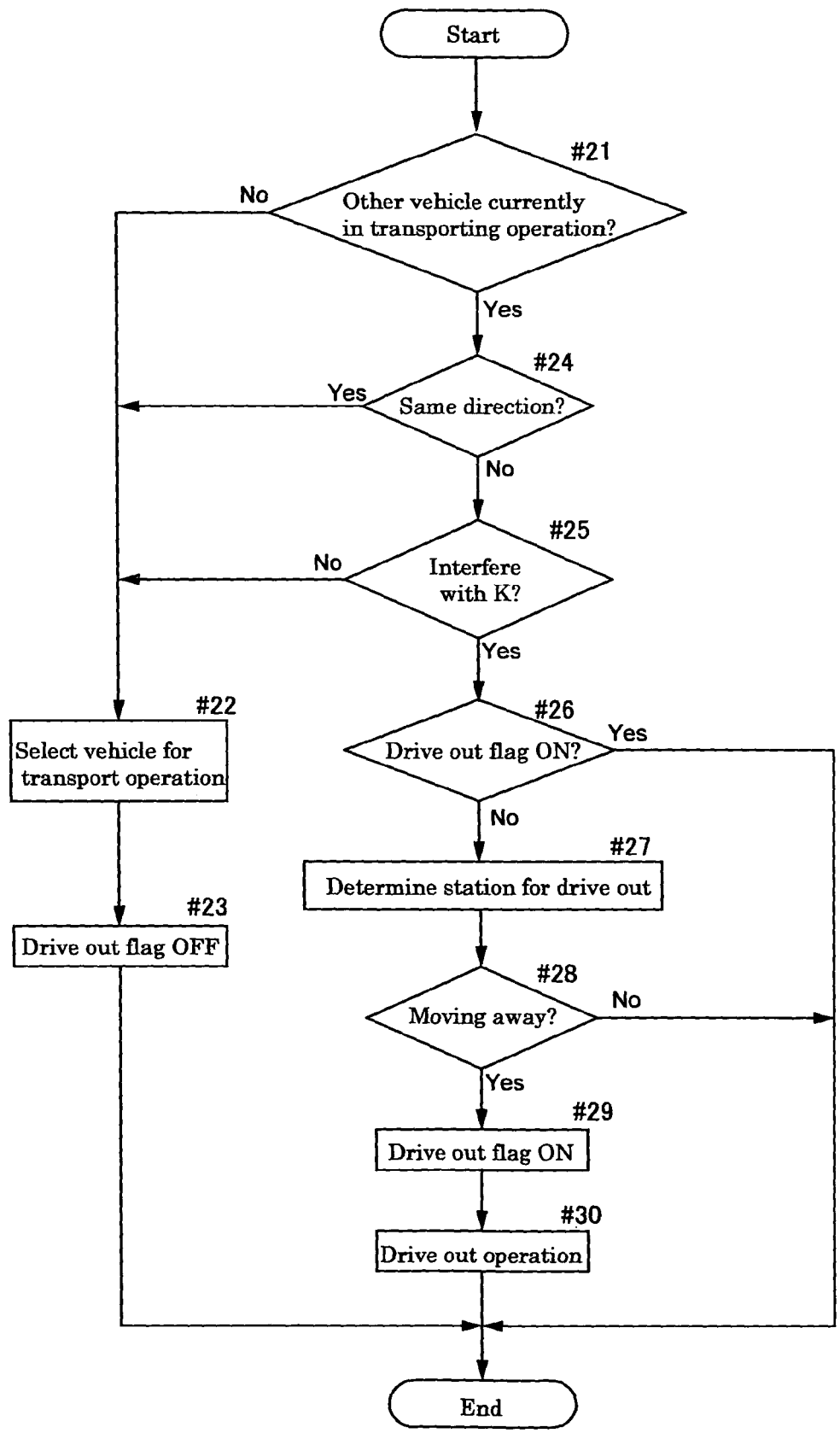
FIG. 7 is a flowchart showing the operation during a selection process for delivering by the ground-side controller.

As shown in FIG. 7, in the selection process for delivering, first the ground-side controller 14 determines whether or not the remaining vehicle other than the article handling vehicle 3 that has performed the receiving transport process is currently performing a transport process, and if it is not currently performing a transport process, then the ground-side controller 14 sets the article handling vehicle 3 that has performed the receiving transport process as the article handling vehicle 3 for the transport process, and if an evacuation flag is ON, then the ground-side controller 14 sets the evacuation flag to OFF (steps 21 to 23).

If the run direction of the article handling vehicle 3 currently performing the transport process is the same as the run direction of the article handling vehicle 3 that has performed the receiving transport process (step 24), or if the run range of the article handling vehicle 3 that has performed the receiving transport process does not interfere with the interference range K (step 25), then the ground-side controller 14 regards the article handling vehicle 3 that has performed the receiving transport process as the article handling vehicle 3 for the transport process, and if the evacuation flag is ON, it then sets the evacuation flag to be OFF (steps 22 and 23).

If the run direction of the article handling vehicle 3 currently performing a transport process is different from the run direction of the article handling vehicle 3 that has performed the receiving transport process, and the run range of the article handling vehicle 3 that has performed the receiving transport process interferes with the interference range K, then if the evacuation flag is OFF, the ground-side controller 14 calculates the evacuation station 1b (steps 26 and 27).

If the evacuation station 1b is farther from the station 1a for transfer than the present position of the article handling vehicle 3 that has performed the receiving transport process, then the ground-side controller 14 sets the evacuation flag to ON and performs an evacuation process to move the article handling vehicle 3 that has performed the receiving transport process to the evacuation station 1b (steps 28 to 30).

Figure 8:
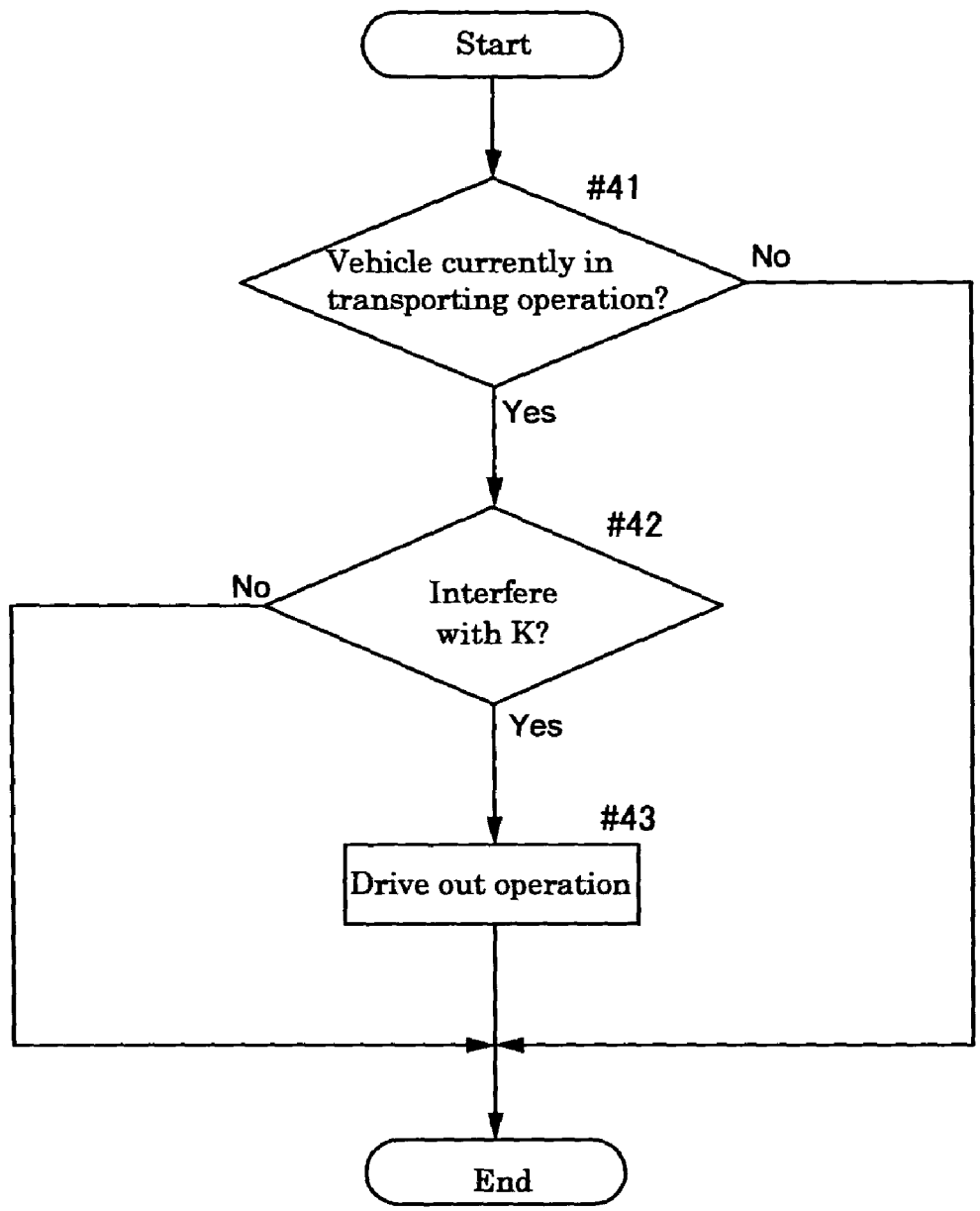
FIG. 8 is a flowchart showing the operation when the ground-side controller performs a selection process for removing.

As shown in the flow chart in FIG. 8, in the selection process for removing, the ground-side controller 14 determines whether or not there is an article handling vehicle 3 that is presently performing a transport process, and if there is, the ground-side controller 14 determines whether or not the current position of the remaining article handling vehicle 3 interferes with the interference range K of the article handling vehicle 3 currently performing the transport process (steps 41 and 42).

If the current position of the remaining article handling vehicle 3 interferes with the interference range K of the article handling vehicle 3 performing the transport process, then the ground-side controller 14 finds the station 1 that is both outside the interference range K and that is the closest station 1 to the current position of the remaining article handling vehicle 3 and regards this as a removal station 1, and then performs a removal process to move the remaining article handling vehicle 3 to the removal station 1 (step 43).

A case in which, in the selection process, the first article handling vehicle 3a is selected as the article handling vehicle 3 for a transport process, and a transport process is performed with the first article handling vehicle 3a, for example, is described in further detail below.

The ground-side controller 14 is configured such that with each passing of a set time, it transmits run command information such as a run start command or a speed command to the travel inverter 7 of the first article handling vehicle 3a via a communication network such as the first optical transmission device 16.

The travel inverter 7 of the first article handling vehicle 3a is configured such that it then drivingly moves the first article handling vehicle 3a while adjusting its run speed by adjusting the electric current value of the travel motor 6 in accordance with the run command information from the ground-side controller 14.

Furthermore, since the detection information from the position detection sensor 15 is input to the ground-side controller 14, the ground-side controller 14 is configured so as to movably drive the first article handling vehicle 3a while controlling the run position of the first article handling vehicle 3a.

The ground-side controller 14 is configured so that when driving the first article handling vehicle 3a while controlling its run position in this manner, it transmits stop command information to the travel inverter 7 of the first article handling vehicle 3a over a transmission network such as the first optical transmission device 16 when the run position of the first article handling vehicle 3a reaches a target stop position that corresponds to the station 1a for transfer.

The travel inverter 7 of the first article handling vehicle 3a is configured so as to stop the first article handling vehicle 3a at the target stop position in accordance with the stop command information from the ground-side controller 14.

When the first article handling vehicle 3a has been stopped at the target stop position, the ground-side controller 14 transmits transfer command information to the transfer inverter 11 of the first article handling vehicle 3a over a communications network such as the first optical transmission device 16.

The transfer inverter 11 of the first article handling vehicle 3a is configured such that, based on the transfer command information from the ground-side controller 14, it operates the transfer device 4 to either receive the article B that is present in the station 1a for transfer or to deliver the article B to the station 1a for transfer.

The input output device 13 sends the information detected by the sensors 12 to the ground-side controller 14 over a communications network such as the first optical transmission device 16, and from the information from the input output device 13, the ground-side controller 14 recognizes when the transfer of the article B with respect to the station 1a for transfer is complete.

It should be noted that if in the evacuation process the article handling vehicle 3 that has performed the receiving transport process is to be moved to the evacuation station 1b, or if in the removal process the article handling vehicle 3 is to be moved to the removal station 1, then in these instances as well the ground-side controller 14 runs the article handling vehicle 3 to the desired station by transmitting run command information, such as a run start command or speed command information, to the travel inverter 7 via a communications network.

By providing the first article handling vehicle 3a and the second article handling vehicle 3b with vehicle distance sensors 8 and slave controllers 10 that are independent of the ground-side controller 14, the risk of the article handling vehicles 3 accidentally colliding due to aberrant control by the ground-side controller 14 is prevented.

More specifically, the slave controllers 10 monitor the relative distance and the relative speed between the article handling vehicles 3 based on the information detected by the vehicle distance sensors 8, and if there is a potential for the article handling vehicles 3 to collide, forcibly stop the movement of the article handling vehicles 3.

That is to say, the slave controllers 10 are configured so that when the relative distance between vehicles is equal to or greater than an allowable distance between vehicles, or when the relative speed is equal to or greater than an allowable relative speed, they activate power stopping means 18 for stopping the supply of power to the travel motors 6 so as to stop the supply of power to the travel motors 6 and thereby stop the article handling vehicles 3.

The configuration of the slave controllers 10 is such that the slave controller 10 on one article handling vehicle 3 sends stop command information for stopping movement of the article handling vehicle 3 to the slave controller 10 on the other article handling vehicle 3 through the vehicle-to-vehicle optical transmission device 9, and the slave controller 10 that receives the stop command information then activates the power stopping means 18 to stop the supply of power to the travel motor 6 so as to stop the article handling vehicle 3.

Other Embodiments (1) In the foregoing embodiment, the ground-side controller 14, in setting the interference range K of the article handling vehicle 3 currently performing a transport process, sets a range that combines the station 1a for transfer, which corresponds to the article handling vehicle 3 that is presently performing the transport process, and the minimum distance between vehicles with which it is possible to avoid a collision between article handling vehicles 3, as the interference range K, but as long as the interference range is centered about the station 1a for transfer corresponding to the first article handling vehicle 3a currently performing the transport process, the range that is set as the interference range K can be suitably changed.

Figure 9:
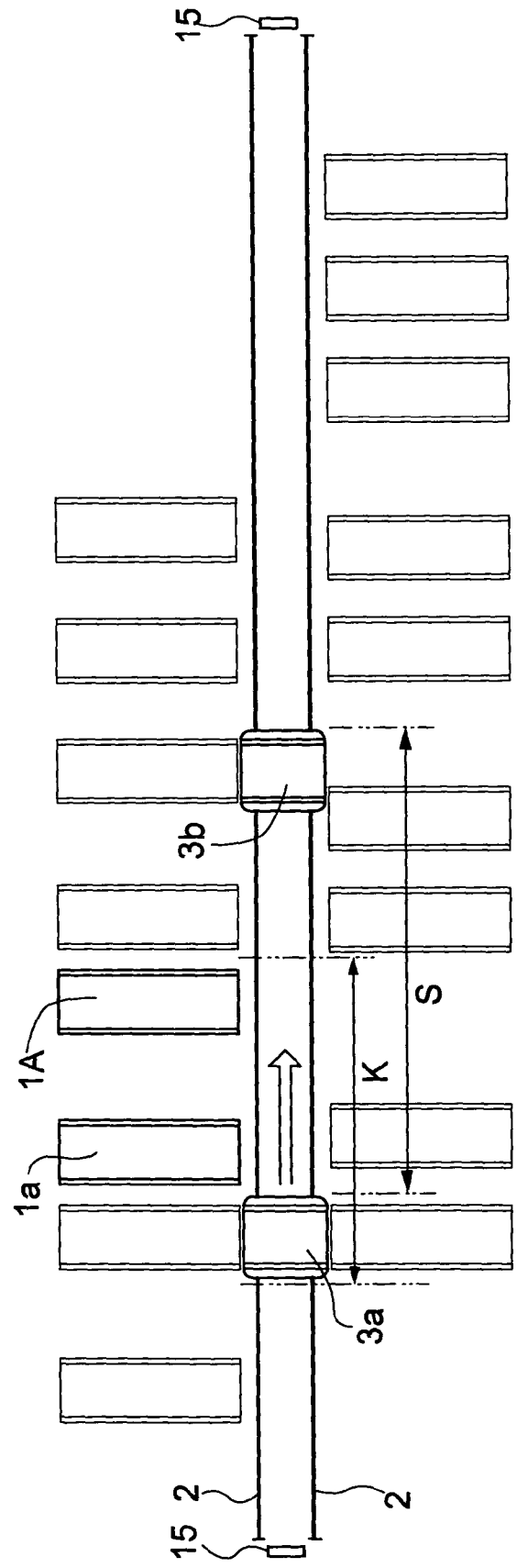
FIG. 9 is a plan view, with one part omitted, of the transport apparatus according to another embodiment.

For example, as shown in FIG. 9, the range between the position of the first article handling vehicle 3a currently performing the transport process and the station 1a for transfer that corresponds to that first article handling vehicle 3a currently performing the transport process can be set as the interference range K.

In FIG. 9, the first article handling vehicle 3a is the vehicle that is currently performing a transport process, the station for transfer that corresponds to the first article handling vehicle 3a currently performing the transport process is the station 1A, the second article handling vehicle 3b is the remaining vehicle, which is not presently performing a transport process, and the station for transfer corresponding to the transport request data that have been generated is the station 1a.

As shown in FIG. 9, if the range between the position of the article handling vehicle 3a currently performing a transport process and the station 1a for transfer is set as the interference range K, then it is possible to set the range between the position of the article handling vehicle 3a currently performing a transport process before it begins that transport process and the station 1a for transfer as a fixed interference range K that serves as the interference range K, or to detect the position of the article handling vehicle 3a currently performing a transport process each passage of a set time and then take the range between the position of the article handling vehicle 3a that is detected with each passage of the set time and the station 1a for transfer as the interference range K and use this to update the interference range K each time the set time passes.

(2) In the foregoing embodiment, the ground-side controller 14 is configured so as to control the position of a plurality of article handling vehicles 3 on the path 2 based on the information detected by the position detection sensor 15, but it is also possible to adopt a configuration in which each article handling vehicle 3 is provided with an encoder and sends the information detected by its encoder to the ground-side controller 14 through its input-output device 13, and based on this information, the ground-side controller 14 controls the positions of the plurality of article handling vehicles 3 on the path 2.

(3) In the foregoing embodiment, a single ground-side controller 14 is provided on the ground side to control the movement of the two article handling vehicles 3, but for example it is also possible to provide each article handling vehicle 3 with a vehicle-side controller with which it can control its own movement and for the ground-side controller 14 to be in communication with the vehicle-side controller of the article handling vehicles and to oversee the operation of all the article handling vehicles 3 through the vehicle-side controller on a specific article handling vehicle 3 or through the vehicle-side controllers of a plurality of article handling vehicles.

(4) In the foregoing embodiment, the ground-side controller 14 performs the receiving transport process and the delivering transport process as separate transport processes, but it is also possible to perform the receiving transport process and the delivering transport process as one series of transport processes.

In this case, when there is an article handling vehicle 3 currently performing a transport process, the ground-side controller 14 sets an interference range centered about the two article transfer locations for transfer, those being the article transfer location for transfer from which the article is to be received and the article transfer location for transfer to which the article the article is to be delivered.

Furthermore, if the receiving transport process and the delivering transport process are performed as a single series of transport processes, then, as shown in FIG. 9, the ground-side controller 14 can set the entire range spanning the position of the first article handling vehicle 3a currently performing a transport process, the station for transfer 1 for receiving the article corresponding to the article handling vehicle 3 currently performing the transport process, and the station for transfer 1 to which the object will be delivered, as the interference range K.

(5) In the aforementioned embodiment, the ground-side controller 14 allows the run range of the article handling vehicle 3 that has been selected for the transport process based on the transport request data to interfere with the interference range if the run direction of the article handling vehicle 3 currently performing a transport process is the same as the run direction of the article handling vehicle 3 that has been selected for a transport process based on the transport request data, and moves the article handling vehicle 3 that has been selected for a transport process to the station for transfer. However, it is also possible to adopt a configuration in which the ground-side controller 14 moves the article handling vehicle 3 that has been selected for a transport process to the station for transfer even if the run direction of the article handling vehicle 3 currently performing a transport process is not the same as the run direction of the article handling vehicle 3 for transport that has been selected based on the transport request data, as long as the run range of the article handling vehicle 3 for transport that has been selected based on the transport request data does not interfere with the interference range.

(6) In the aforementioned embodiment, where appropriate it is possible to change the number of stations 1 or the arrangement of any of the stations 1.

(7) The aforementioned embodiment describes an example in which a vehicle distance sensor 8 and a slave controller 10 are provided in each of the two article handling vehicles 3, but it is also possible to adopt a configuration in which the vehicle distance sensor 8 and the slave controller 10 are provided in only one of the two article handling vehicles 3, and if there is a possibility that the relative distance between vehicles will be equal to or greater than an allowable distance between vehicles or that the relative speed will be equal to or greater than an allowable relative speed, for the one article handling vehicle 3, through the vehicle-to-vehicle optical transmission device 9, to notify the other article handling vehicle 3 that there is a possibility of a collision, and for the other article handling vehicle 3 to be stopped in accordance with that communication.

(8) The aforementioned embodiment illustratively describes a case in which two article handling vehicles 3 are provided, but the number of article handling vehicles 3 can be altered where appropriate.

(9) In the aforementioned embodiment, the article handling vehicles 3 are shown as examples of article transporting vehicles, but it is also possible to employ stacker cranes that run back and forth along a path between a pair of article storage shelves, for example, as the article transporting vehicles, and it is also possible to use article transporting vehicles other than Me article handling vehicles 3.

(10) In the aforementioned embodiment, an optical transmission device was given as an example of the communication device, but in place of this it is also possible to use a communication device that uses other media such as electromagnetic waves or sound waves, and the communication device can be any type of wireless device or wired device.

What is claimed is:

1. An article transport method for an article transport apparatus that comprises a plurality of article transporting vehicles that run along a path that is arranged along a plurality of article transferring locations and that has a first end and a second end, and a controller that controls movement of the plurality of article transporting vehicles, and that processes transport request data that includes information specifying an article transferring location for transfer from among the plurality of article transferring locations, the method comprising:

a step in which, when the transport request data is generated, the controller that processes said generated transport request data determines whether or not there is an article transporting vehicle currently performing a transport process;

a step in which, when it is determined that there is no article transporting vehicle currently performing a transport process, the controller processes the transport request data by selecting an article transporting vehicle that is closest to the article transferring location specified by the generated transport request data as an article transporting vehicle for a transport process corresponding to the generated transport request data, and moving the selected article transporting vehicle to the specified article transferring location; and a step in which, when it is determined that there is a first article transporting vehicle currently performing a transport process, the controller processes the transport request data while allowing the transport process of the first article transporting vehicle by setting an interference range along a lengthwise direction of the path that originates from the article transferring location for transfer by the first article transporting vehicle, selecting a second article transporting vehicle different from the first article transporting vehicle as an article transporting vehicle for a transport process corresponding to the generated transport request data, as long as a run range of the second article transporting vehicle does not overlap with the interference range, and moving the second article transporting vehicle to the specified article transferring location; the controller selects the second article transporting vehicle based on the relative run directions of the first and second article transporting vehicles; and wherein when the transport process of the first article transporting vehicle is a receiving transport process for receiving an article, the interference range is set originating from the article transferring location for transfer from which the article is to be received, and when the transport process of the first article transporting vehicle is a delivering transport process for delivering an article, the interference range is set originating from the article transferring location for transfer to which the article is to be delivered.

2. The article transport method according to claim 1, wherein the interference range has a length comprising either a combination of a width, in a lengthwise direction of the path, of the article transferring location for transfer by the first article transporting vehicle and a minimum distance between vehicles with which it is possible to avoid a collision between the article transporting vehicles, or a combination of a width, in a lengthwise direction of the path, of the first article transporting vehicle and the minimum distance between vehicles, and the interference range is set based on the article transferring location for transfer by the first article transporting vehicle as the center of its extension.

3. The article transport method according to claim 2, wherein when it is determined that there is a first article transporting vehicle currently performing a transport process, the transport request data is processed by selecting an article transporting vehicle different from the first article transporting vehicle whose run range overlaps with the interference range and whose run direction is the same as a run direction of the first article transporting vehicle, as a third article transporting vehicle for a transport process corresponding to the generated transport request data, while allowing the overlap between the run range of the third article transporting vehicle and the interference range and moving the third article transporting vehicle to the specified article transferring location.

4. The article transport method according to claim 1, wherein when it is determined that there is a first article transporting vehicle currently performing a transport process, the transport request data is processed by selecting an article transporting vehicle different from the first article transporting vehicle whose run range overlaps with the interference range and whose run direction is the same as a run direction of the first article transporting vehicle, as a third article transporting vehicle for a transport process corresponding to the generated transport request data, while allowing the overlap between the run range of the third article transporting vehicle and the interference range and moving the third article transporting vehicle to the specified article transferring location.

5. An article transport apparatus comprising:

a path that is arranged along a plurality of article transferring locations and that has a first end and a second end;

a plurality of article transporting vehicles that run along the path; and a controller that controls movement of the plurality of article transporting vehicles, and that processes transport request data that includes information specifying an article transferring location for transfer from among the plurality of article transferring locations, wherein, when the transport request data is generated, the controller processes the generated transport request data by selecting an article transporting vehicle for a transport process from among the plurality of article transporting vehicles based on the transport request data, and moving the selected article transporting vehicle to the specified article transferring location, and wherein, in the process of the transport request data, when there is no article transporting vehicle currently performing a transport process and the transport request data is generated, the controller selects the article transporting vehicle that is closest to the article transferring location specified by the transport request data as an article transporting vehicle for a transport process corresponding to the generated transport request data; and when there is a first article transporting vehicle currently performing a transport process and the transport request data is generated, while allowing a transport process of the first article transporting vehicle, the controller sets an interference range along a lengthwise direction of the path that originates from the article transferring location for transfer by the first article transporting vehicle, and selects a second article transporting vehicle different from the first article transporting vehicle as an article transporting vehicle for a transport process corresponding to the generated transport request data, as long as a run range of the second article transporting vehicle does not overlap with the interference range; the controller selects the second article transporting vehicle based on the relative run directions of the first and second article transporting vehicles; and wherein when the transport process of the first article transporting vehicle is a receiving transport process for receiving an article, the controller sets the interference range originating from the article transferring location for transfer from which the article is to be received, and when the transport process of the first article transporting vehicle is a delivering transport process for delivering an article, the controller sets the interference range originating from the article transferring location for transfer to which the article is to be delivered.

6. The article transport apparatus according to claim 5, wherein the interference range has a length comprising either a combination of a width, in a lengthwise direction of the path of the article transferring location for transfer by the first article transporting vehicle and a minimum distance between vehicles with which it is possible to avoid a collision between the article transporting vehicles, or a combination of a width, in a lengthwise direction of the path of the first article transporting vehicle and the minimum distance between vehicles, and the interference range is set based on the article transferring location for transfer by the first article transporting vehicle as the center of its extension.

7. The article transport apparatus according to claim 6, wherein when there is a first article transporting vehicle currently performing a transport process and the transport request data is generated, the controller selects an article transporting vehicle different from the first article transporting vehicle whose run range overlaps with the interference range and whose run direction is the same as a run direction of the first article transporting vehicle, as a third article transporting vehicle for a transport process corresponding to the generated transport request data, while allowing the overlap between the run range of the third article transporting vehicle and the interference range.

8. The article transport apparatus according to claim 5, wherein when there is a first article transporting vehicle currently performing a transport process and the transport request data is generated, the controller selects an article transporting vehicle different from the first article transporting vehicle whose run range overlaps with the interference range and whose run direction is the same as a run direction of the first article transporting vehicle, as a third article transporting vehicle for a transport process corresponding to the generated transport request data, while allowing the overlap between the run range of the third article transporting vehicle and the interference range.

* * * * *

UNITED STATES PATENT AND TRADEMARK OFFICE
CERTIFICATE OF CORRECTION

| | | |
|---|---|---|
| PATENT NO. | : 7,853,371 B2 | Page 1 of 1 |
| APPLICATION NO. | : 11/199558 | |
| DATED | : December 14, 2010 | |
| INVENTOR(S) | : Koide | |

It is certified that error appears in the above-identified patent and that said Letters Patent is hereby corrected as shown below:

Column 16, line 48, Claim 5, "wherein, in the process" should read
-- wherein, in the processing --

Signed and Sealed this
Nineteenth Day of April, 2011

David J. Kappos
*Director of the United States Patent and Trademark Office*